United States Patent [19]

Yamaguchi et al.

[11] Patent Number: 5,155,616
[45] Date of Patent: Oct. 13, 1992

[54] SCANNING OPTICAL SYSTEM

[75] Inventors: Katsumi Yamaguchi, Yokohama; Nobuo Sakuma, Inagi, both of Japan

[73] Assignee: Ricoh Company, Ltd., Tokyo, Japan

[21] Appl. No.: 784,136

[22] Filed: Oct. 29, 1991

Related U.S. Application Data

[63] Continuation of Ser. No. 553,644, Jul. 18, 1990, abandoned.

[30] Foreign Application Priority Data

| Jul. 20, 1989 | [JP] | Japan | 1-185912 |
| Jul. 21, 1989 | [JP] | Japan | 1-189882 |
| Aug. 9, 1989 | [JP] | Japan | 1-206285 |
| Aug. 10, 1989 | [JP] | Japan | 1-205715 |
| Feb. 13, 1990 | [JP] | Japan | 2-29704 |

[51] Int. Cl.$^5$ .................... G02B 26/08; G02B 7/02
[52] U.S. Cl. .................... 359/216; 359/209; 359/820
[58] Field of Search ............ 350/6.1, 6.5–6.91; 250/235–236; 359/820, 819

[56] References Cited

U.S. PATENT DOCUMENTS

| 4,720,168 | 1/1988 | Kaneko | 359/820 |
| 4,815,059 | 3/1989 | Nakayama et al. | 359/820 |
| 4,855,987 | 8/1989 | Versluis | 359/820 |
| 4,906,061 | 3/1990 | Yamaguchi | 350/6.3 |
| 4,934,772 | 6/1990 | Sakuma et al. | 350/6.7 |
| 4,955,682 | 9/1990 | Yamaguchi | 350/6.8 |
| 4,962,982 | 10/1990 | Takanashi | 350/6.8 |
| 5,005,928 | 4/1991 | Suzuki et al. | 350/6.8 |

FOREIGN PATENT DOCUMENTS

| 58-7109 | 1/1983 | Japan | 359/820 |
| 59-15205 | 1/1984 | Japan | 359/820 |
| 62-183411 | 8/1987 | Japan | 359/820 |

Primary Examiner—Bruce Y. Arnold
Assistant Examiner—James Phan
Attorney, Agent, or Firm—Oblon, Spivak, McClelland, Maier & Neustadt

[57] ABSTRACT

A scanning optical system has a light source for emitting a light beam; a condenser lens for changing the light beam from the light source to a parallel light beam; a connection holding member for supporting the light source and the condenser lens; a deflector for deflecting an approximately parallel light beam transmitted from the condenser lens at an equiangular velocity; and a lens for optical scanning for scanning a scanned face at an approximately equal speed while converging the light beam deflected by the deflector and forming an image in the shape of a spot on the scanned face, the lens for optical scanning being formed by a plastic material for optics. This scanning optical system is constructed such that a coefficient of linear expansion of the connection holding member, a focal length of the condenser lens, a focal length, a refractive index and a coefficient of linear expansion of the lens for optical scanning, and a change in refractive index of the lens for optical scanning with respect to the change in environmental temperature satisfy a predetermined condition. Another condition using other parameters with respect to the lens optical system may be set.

3 Claims, 2 Drawing Sheets

SCANNING OPTICAL SYSTEM

This application is a continuation of application Ser. No. 07/553,644, filed on Jul. 18, 1990, now abandoned.

BACKGROUND OF THE INVENTION

1. Field of the Invention

The present invention relates to a scanning optical system most suitable for a writing optical system in a laser printer, a digital copying machine, a facsimile, etc. in which a scanned face is scanned by a light beam from a semiconductor laser or a light-emitting diode as a light source, and an optical system in a reading device, a laser display, a laser measuring device, etc.

2. Description of the Related Art

In a recorder such as a laser printer, a scanning optical system is used to write information to a suitable recording medium.

In the scanning optical system, when an $f\theta$ lens constituting a lens for optical scanning is made of plastic, the changes in shape, refractive index, etc. of this lens are caused by the change in environment, especially, the change in temperature. Therefore, the position of a formed image point in the vicinity of the scanned face is changed so that it is difficult to stably provide the uniform diameter of a beam spot on the scanned face.

In lens correction methods shown in Japanese Patent Application Laying Open (KOKAI) Nos. 63-7530 and 61-150394, the problems about the change in focal length of the $f\theta$ lens caused by the change in environmental temperature are still not solved. Therefore, it is desirable to provide an optical scanning system for generally solving the above-mentioned problems.

SUMMARY OF THE INVENTION

It is therefore a first object of the present invention to provide a scanning optical system in which a light beam from a light source is changed to a parallel beam by a condenser lens and a scanning operation is performed at an approximately equal speed with respect to the light beam deflected by a deflector at an equal angular velocity so as to reduce an influence of the $f\theta$ lens caused by the change in environment thereof, especially, the change in temperature thereof.

A second object of the present invention is to provide a scanning optical system for generally reducing extremely the change in focal length of the $f\theta$ lens and the change in distance between the light source and the condenser lens caused by the change in environmental temperature, and the change in position of the formed image point caused by the shift in emission wavelength of the light source so that the $f\theta$ lens made of plastic can by practically used and the scanning optical system is cheaply manufactured and withstands the change in environmental temperature and has a high performance.

A third object of the present invention is to provide a scanning optical system for canceling the change in focal length of the $f\theta$ lens as a lens for optical scanning and the change in distance between the light source and the condenser lens caused by the change in environmental temperature to extremely reduce an influence of the optical system caused by the change in temperature so that the $f\theta$ lens made of plastic can be practically used and the scanning optical system is cheaply manufactured and withstands the change in environmental temperature and has a high performance.

In a first embodiment of the present invention, the above first object can be achieved by a scanning optical system comprising a light source for emitting a light beam; a condenser lens for changing the light beam from the light source to a parallel light beam; a connection holding member for supporting the light source and the condenser lens; a deflector for deflecting the approximately parallel light beam transmitted from the condenser lens at an equiangular velocity; and a lens for optical scanning for scanning a scanned face at an approximately equal speed while converging the light beam deflected by the deflector and forming an image in the shape of a spot on the scanned face, the lens for optical scanning being formed by a plastic material for optics. This scanning optical system is constructed such that a coefficient $\alpha$ of linear expansion of the connection holding member, a focal length $f_1$ of the condenser lens, a focal length $f_2$, a refractive index $n$ and a coefficient $\alpha'$ of linear expansion of the lens for optical scanning, and a change $dn/dT$ in refractive index of the lens for optical scanning with respect to the change in environmental temperature satisfy the following condition.

$$0.5 < \frac{f_2}{f_1} \cdot \frac{\alpha}{\alpha' - \frac{1}{n-1} \cdot \frac{dn}{dT}} < 2$$

In a second embodiment of the present invention, the above second object can be achieved by a scanning optical system comprising a light source for emitting a light beam; a condenser lens for changing the light beam from the light source to an approximately parallel light beam; a connection holding member for supporting the light source and the condenser lens; a deflector for deflecting the approximately parallel light beam transmitted from the condenser lens at an equiangular velocity; and a lens for optical scanning for scanning a scanned face at an approximately equal speed while converging the light beam deflected by the deflector and forming an image in the shape of a spot on the scanned face, the lens for optical scanning being formed by a plastic material for optics. This scanning optical system is constructed such that a coefficient $\alpha$ of linear expansion of the connection holding member, a focal length $f_1$ of the condenser lens, chromatic aberration $df_1/d\lambda$ of the condenser lens on an optical axis thereof, a focal length $f_2$, a refractive index $n$ and a coefficient $\alpha'$ of linear expansion of the lens for optical scanning, a change $dn/dT$ in refractive index of the lens for optical scanning with respect to the change in environmental temperature, and a shift $d\lambda/dT$ in wavelength of the light beam emitted from the light source with respect to the change in temperature satisfy the following condition.

$$0.3 < \frac{f_2}{f_1} \cdot \frac{\alpha - \frac{1}{f_1} \cdot \frac{d\lambda}{dT} \cdot \frac{df_1}{d\lambda}}{\alpha' - \frac{1}{n-1} \cdot \frac{dn}{dT}} < 2$$

In a third embodiment of the present invention, the above third object can be achieved by a scanning optical system comprising a light source for emitting a light beam; a condenser lens for changing the light beam from the light source to a convergent light beam; a connection holding member for supporting the light source and the condenser lens; a deflector for deflecting the convergent light beam transmitted from the condenser lens at an equiangular velocity; and a single lens for optical scanning for scanning a scanned face at an approximately equal speed while further converging the convergent light beam deflected by the deflector and forming an image in the shape of a spot on the scanned face, the lens for optical scanning being formed by a plastic material for optics. This scanning optical system is constructed such that a coefficient $\alpha$ of linear expansion of the connection holding member, a focal length $f_1$ and a lateral magnification $\beta_1$ of the condenser lens, a focal length $f_2$, a refractive index n and a coefficient $\alpha'$ of linear expansion of the lens for optical scanning, a change dn/dT in refractive index of the lens for optical scanning with respect to the change in environmental temperature, and a lateral magnification $\beta_2$ of the lens for optical scanning satisfy the following condition.

$$0.5 < \frac{\beta_1^2 \times \beta_2^2}{(1-\beta_2)^2} \times \frac{f_1}{f_2} \times \frac{\alpha}{\alpha' - \frac{1}{n-1} \times \frac{dn}{dT}} < 2.0$$

In a fourth embodiment of the present invention, the above second object can be achieved by a scanning optical system comprising a light source for emitting a light beam; a condenser lens for changing the light beam from the light source to a convergent light beam; a connection holding member for supporting the light source and the condenser lens; a deflector for deflecting the convergent light beam transmitted from the condenser lens at an equiangular velocity; and a single lens for optical scanning for scanning a scanned face at an approximately equal speed while further converging the convergent light beam deflected by the deflector and forming an image in the shape of a spot on the scanned face, the lens for optical scanning being formed by a plastic material for optics. This scanning optical system is constructed such that a shift d$\lambda$/dT in wavelength of the light beam emitted from the light source with respect to the change in environment, a coefficient $\alpha$ of linear expansion of the connection holding member, a focal length $f_1$ and a lateral magnification $\beta_1$ of the condenser lens, chromatic aberration d$f_1$/d$\lambda$ of the condenser lens on an optical axis thereof, a focal length $f_2$, a refractive index n and a coefficient $\alpha'$ of linear expansion of the lens for optical scanning, a change dn/dT in refractive index of the lens for optical scanning with respect to the change in environmental temperature, and a lateral magnification $\beta_2$ of the lens for optical scanning satisfy the following condition.

$$0.4 < \frac{\beta_1 \cdot \beta_2^2}{(1-\beta_2)^2} \cdot \frac{f_1}{f_2} \times \frac{\alpha - \frac{1}{f_1} \cdot \frac{d\lambda}{dT} \cdot \frac{df_1}{d\lambda}}{\alpha' - \frac{1}{n-1} \cdot \frac{dn}{dT}} < 2.0$$

In the above-mentioned scanning optical system in the first embodiment of the present invention, the connection holding member supports the light source for emitting the light beam and the condenser lens for changing the light beam from this light source to the parallel light beam. The material of the connection holding member and the plastic material for optics constituting the f$\theta$ lens as the lens for optical scanning are suitably provided in combination with the values of the focal length $f_1$ of the condenser lens and the focal length $f_2$ of the f$\theta$ lens. Otherwise, the material of the connection holding member and the plastic material for optics of the f$\theta$ lens are suitably selected in accordance with the values of the focal length $f_1$ of the condenser lens and the focal length $f_2$ of the f$\theta$ lens. Thus, the change in position of the formed image point of the beam spot on the scanned face with respect to the change in environmental temperature is reduced.

In the second embodiment of the present invention, the scanning optical system has the light source, the condenser lens, the connection holding member for connecting and supporting the light source and the condenser lens, and the lens for optical scanning made of plastic. The suitable chromatic aberration is provided for the condenser lens. Further, the material of the connection holding member and the plastic material for optics constituting the lens for optical scanning are suitably provided in combination with the respective values of the focal length $f_1$ of the condenser lens, the focal length $f_2$ of the lens for optical scanning and the chromatic aberration d$f_1$/d$\lambda$ of the condenser lens on the optical axis thereof. Otherwise, the material of the connection holding member and the plastic material for optics are suitably selected in accordance with the respective values $f_1$, $f_2$ and d$f_1$/d$\lambda$. Thus, the total change in position of the formed image point in the vicinity of the scanned face is reduced so that the scanning optical system withstanding the change in environmental temperature is provided.

In the scanning optical system in the third embodiment of the present invention, the connection holding member supports the light source for emitting the light beam and the condenser lens for changing the light beam from this light source to the convergent light beam. The material of the connection holding member and the plastic material for optics constituting the lens for optical scanning are suitably provided in combination with the values of the focal length $f_1$ of the condenser lens and the focal length $f_2$ of the lens for optical scanning. Otherwise, the material of the connection holding member and the plastic material for optics constituting the lens for optical scanning are suitably selected in accordance with the values of the focal length $f_1$ of the condenser lens and the focal length $f_2$ of the lens for optical scanning. Thus, the change in position of the image point formed by the lens for optical scanning with respect to the change in environmental temperature is reduced.

In the fourth embodiment of the present invention, the scanning optical system has the light source, the condenser lens, the connection holding member for connecting and supporting the light source and the condenser lens, and the lens for optical scanning made of plastic. The suitable chromatic aberration is provided for the condenser lens. Further, the material of the connection holding member and the plastic material for optics constituting the lens for optical scanning are suitably provided in combination with the respective values of the focal length $f_1$ of the condenser lens, the lateral magnification $\beta_1$ of this condenser lens, the focal length $f_2$ of the lens for optical scanning, the lateral magnification $\beta_2$ of this lens for optical scanning, and the chromatic aberration d$f_1$/d$\lambda$ of the condenser lens on the optical axis thereof. Otherwise, the material of the connection holding member and the plastic material for optics are suitably selected in accordance with the respective values $f_1$, $f_2$, d$f_1$/d$\lambda$, $\beta_1$ and $\beta_2$. Thus, the total change in position of the formed image point in the vicinity of the scanned face is reduced so that the scanning optical system withstanding the change in environmental temperature is provided.

Further object and advantages of the present invention will be apparent from the following description of the preferred embodiments of the present invention as illustrated in the accompanying drawings.

DESCRIPTION OF THE PREFERRED EMBODIMENTS

The preferred embodiments of a scanning optical system in the present invention will next be described in detail with reference to the accompanying drawings.

Figure 1:
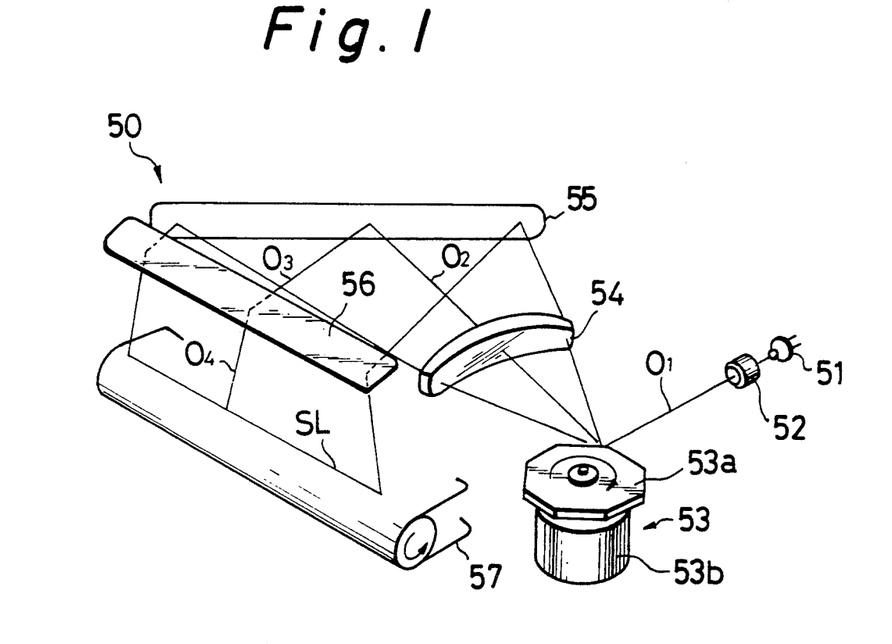
FIG. 1 is a perspective view schematically showing one example of the construction of a general scanning optical system used in a laser printer.

FIG. 1 shows a general example of the construction of a scanning optical system used in a laser printer.

In FIG. 1, a general laser printer 50 has a light source device 51 composed of a laser diode. The light source device and the laser diode are respectively called a light source and an LD in the following description.

A condenser lens 52 is constructed such that a laser beam from the light source 51 is focused and formed as an image on a rotary polygon mirror 53a of a deflecting device 53 along a first optical axis $O_1$ of the optical system. This rotary polygon mirror 53a is rotated by the operation of a suitable motor 53b at an equal speed.

A lens 54 for optical scanning is disposed between the deflecting device 53 and a first fixed reflecting mirror 55. This lens 54 for optical scanning is called an f$\theta$ lens in the following description. An approximately parallel laser beam is reflected on the rotary polygon mirror 53a as a deflecting face of the deflecting device 53 and is transmitted by this lens 54 toward the first fixed reflecting mirror 55 along a second optical axis $O_2$ of the optical system while this laser beam is changed to a convergent light beam. This deflecting device 53 is normally constructed by a polygon mirror, a pyramidal mirror, etc.

A second fixed reflecting mirror 56 reflects a convergent light beam reflected on the first fixed reflecting mirror 55 and transmitted along a third optical axis $O_3$ of the optical system. This light beam is formed as an image on a scanning line SL set on a surface of a photosensitive body 57 along a fourth optical axis $O_4$ of the optical system.

In the scanning optical system constructed above, a connection holding member is used to fixedly hold both the light source 51 and the condenser lens 54. The distance between the light source 51 and the condenser lens 52 is changed in accordance with expansion and contraction of the connection holding member for connecting the light source 51 and the condenser lens 52 caused by the change in environment, especially, the change in temperature. Therefore, the light beam transmitted from the condenser lens 52 does not become a parallel light beam so that no uniform beam spot having a predetermined diameter can be stably obtained on the scanned face by the convergent action of the f$\theta$ lens at the next stage.

When a wavelength of the light beam from the light source is changed, the focal length of the condenser lens 52 is changed. When the material of the holding member is set to substantially cancel this change in focal length of this lens 52, the laser beam transmitted from the condenser lens 52 substantially has the same wave surface shape at any time irrespective of the change in temperature. A light source device of a semiconductor laser having such a construction is proposed by the same applicant as that in this application in Japanese Patent Application Laying Open (KOKAI) No. 61-150394.

In another light source device, chromatic aberration of the condenser lens 52 on the optical axis thereof is provided such that the change in focal length of the condenser lens 52 caused by the shift in wavelength of the light beam from the light source is substantially canceled by the change in axial distance of the holding member caused by the change in temperature, i.e., the change in distance between the light source 51 and the condenser lens 52. Thus, the laser beam transmitted from the condenser lens 52 substantially has the same wave surface shape at any time irrespective of the change in temperature by providing such chromatic aberration. This light source device is proposed by the same applicant as that in this application in Japanese Patent Application Laying Open (KOKAI) No. 63-7530.

However, when the f$\theta$ lens 54 is made of plastic, the changes in shape, refractive index, etc. of this lens are caused by the change in environment, especially, the change in temperature. Therefore, the position of an image point formed by this lens in the vicinity of the scanned face is changed so that it is difficult to stably provide the uniform diameter of the beam spot on the scanned face.

For example, when the f$\theta$ lens is made of polycarbonate (which is called a PC material in the following description) and has a focal length $f_2 = 200$ (mm), the change $\Delta f_2$ in focal length of this lens is provided as follows.

$$\Delta f_2 = \left( \alpha' - \frac{1}{n-1} \cdot \frac{dn}{dT} \right) \cdot f_2 \cdot \Delta T$$

$$= 0.0456 \cdot \Delta T \sim 0.0631 \cdot \Delta T$$

where refractive index $n = 1.57$,
coefficient of linear expansion $\alpha' = 7 \times 10^{-5}$ [K$^{-1}$], and
change in refractive index $dn/dT = -9$ to $-14$ ($\times 10^{-5}$/K).

In the above formula, reference numeral $\Delta T$ designates the change in temperature of the lens.

The temperature of the interior of the light source device is normally changed about 50 K. Accordingly, the following formula is obtained.

$$\Delta f_2 = 0.0456 \times 50 \sim 0.0631 \times 50$$

$$= 2.28 \sim 3.155$$

Therefore, the focal length of the lens is changed about 2 to 3 mm so that the position of the formed image point in the vicinity of the scanned face is similarly changed about 2 to 3 mm. Accordingly, no stable diameter of the beam spot can be obtained on the scanned face.

In lens correction methods shown in Japanese Patent Application Laying Open (KOKAI) Nos. 63-7530 and 61-150394, the problems about the change in focal length of the fθ lens caused by the change in environmental temperature thereof are still not solved. Therefore, it is desirable to provide an optical scanning system for generally solving the above-mentioned problems.

Figure 2:
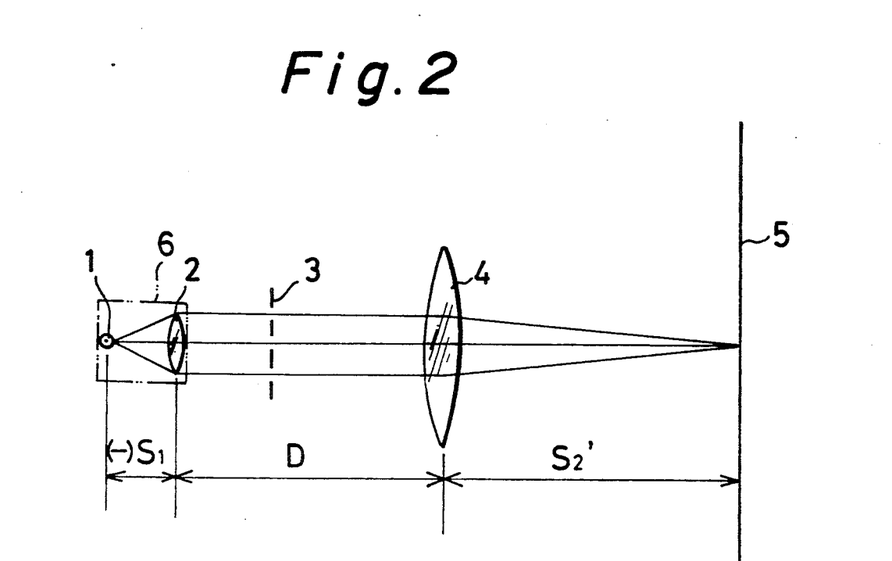
FIG. 2 is a view typically showing an optical path of a scanning optical system in each of first and second embodiments of the present invention.

FIG. 2 is a view typically developing and showing an optical path of a scanning optical system in each of first and second embodiments of the present invention. A light source or light source device 1 emits a light beam for optical scanning and can be constructed by a semiconductor laser, a light-emitting diode. etc. In the embodiments, the light source 1 is constructed by a semiconductor diode. A condenser lens 2 is arranged backward fromt the light source 1 (i.e., rightward in FIG. 2) and changes a divergent light beam emitted from the semiconductor diode to a parallel light beam.

A deflecting face 3 is arranged backward from the condenser lens 2 and is operated to perform a deflecting operation by an unillustrated deflector (or a deflecting device). An fθ lens 4 as a lens for optical scanning is arranged backward from this deflecting face 3. The above deflector can be constructed by a system for rotating a polygon mirror or a pyramidal mirror.

A scanned face 5 is arranged backward from the fθ lens 4 and corresponds to the photosensitive body 57 shown in FIG. 1.

The distance from the light source 1 to a main point of the condenser lens 2 on the front side thereof, i.e., an object distance is designated by reference numeral $S_1$. The distance from a main point of the condenser lens 2 on the rear side thereof to a main point of the fθ lens 4 on the front side thereof is designated by reference numeral D. The distance from a main point of the fθ lens 4 on the rear side thereof to a formed image point in the vicinity of the scanned face 5 is designated by reference numeral $S_2'$. The focal length of the condenser lens 2 is set to $f_1$ and the focal length of the fθ lens 4 is set to $f_2$.

When $S_1 = -f_1$, the light beam transmitted from the condenser lens 2 becomes a parallel beam.

The distance from the main point of the condenser lens 2 on the rear side thereof to the formed image point of the light beam after the condenser lens 2 is set to $S_1'$. In this case, when $S_1' = \infty$ is set, $S_2 = \infty$ is formed where $S_2$ designates the distance from the main point of the fθ lens 4 on the front side thereof to the formed image point of the incident light beam of the fθ lens 4.

At this time, $S_2' = f_2$ is formed so that the formed image point is located on the scanned face 5 if the scanned face 5 is set in a position separated by focal length $f_2$ from the main point of the fθ lens 4 on the rear side thereof.

In the scanning optical system constructed above, the laser beam is deflected on the deflecting face 3 of the deflector at an equal angular velocity and is formed by the fθ lens 4 as an image on the scanned face 5, thereby performing a scanning operation on a scanning line of the scanned face 5 at an approximately equal speed.

This approximately equal speed means a speed provided such that a shift in speed from the equal speed can be corrected by an electric signal processing.

In such a scanning optical system, the change in position of the image point caused by the change in environmental temperature is based on the above-mentioned three factors as follows.

A first factor is the change in position of the formed image point in the vicinity of the scanned face 5 which is caused by the change in distance between the light source 1 and the condenser lens 2 caused by the change in temperature. A second factor is the change in position of the formed image point which is caused by the changes in shape and optical characteristic of the fθ lens 4 caused by the change in temperature. A third factor is the change in position of the formed image point which is caused by the shift in emission wavelength of the light source 1 caused by the change in temperature.

The following analyzing results are obtained with respect to the change in position of the formed image point in the vicinity of the scanned face 5 which is caused by the change in distance between the light source 1 and the condenser lens 2 caused by the change in temperature.

The focal length of the condenser lens 2 is set to $f_1$. A connection holding member 6 for connecting and supporting the light source 1 and the condenser lens 2 has a coefficient α of linear expansion and the change in temperature is set to ΔT. It is assumed that the length of the connection holding member 6 is equal to the focal length $f_1$ of the condenser lens 2. In this case, the change Δ in distance between the light source 1 and the condenser lens 2 caused by the change in temperature can be represented by the following formula.

$$\Delta = \alpha \cdot f_1 \cdot \Delta T.$$

Since $S_1 = -f_1$ is formed, $S_1$ is changed to $(-f_1 = \Delta)$ by the change in temperature.

In this case, the following formulas are generally formed.

$$1/S_1' = (1/S_1) + (1/f_1)$$

$$1/S_2' = (1/S_2) + (1/f_2)$$

$$S_2 = S_1' - D.$$

If $\Delta < < f_1$ is set and the object distance $S_1$ is changed from $-f_1$ to $-f_1 - \Delta$ by the change in temperature, virtual distance $S_1'$ of the condenser lens 2 is changed as follows.

$$S_1' = \infty \to S_1' = f_1^2/\Delta.$$

The above distance $S_2$ with respect to the fθ lens 4 is changed as follows.

$$S_2 = \infty \to S_2 = (f_1^2/\Delta) - D \sim (f_1^2/\Delta).$$

The above distance $S_2'$ with respect to the fθ lens 4 is changed as follows.

$$S_2' = f_2 \to S_2' = f_2 - (f_2/f_1)^2 \cdot \Delta.$$

Accordingly, the change A in position of the formed image point caused by thermal expansion of the holding member 6 is provided by the following formula.

$$A = -(f_2/f_1)^2 \cdot \Delta = -(\alpha \cdot f_2^2/f_1) \cdot \Delta T.$$

The formed image point is moved on the side of the fθ lens 4 (in the left-hand direction in FIG. 1) by the increase in temperature.

The change in position of the formed image point caused by the change in temperature of the fθ lens 4 will next be considered.

The coefficient of linear expansion of the material constituting the fθ lens 4 is set to $\alpha'$ and a rate of change in refractive index of this lens with respect to temperature is set to $dn/dT$. In this case, in general, a rate $df/dT$ of change in focal length of a single lens with respect to temperature can be approximately provided by the following formula under a condition in which this lens is deformed in a similar figure.

$$\frac{1}{f} \cdot \frac{df}{dT} = \alpha' - \frac{1}{n-1} \cdot \frac{dn}{dT}$$

Accordingly, the change $\Delta f_2$ in focal distance $f_2$ of the fθ lens 4 is provided by the following formula.

$$\Delta f_2 = \left( \alpha' - \frac{1}{n-1} \cdot \frac{dn}{dT} \right) f_2 \cdot \Delta T$$

The change B in position of the formed image point is provided by the following formula.

$$B = \left( \alpha' - \frac{1}{n-1} \cdot \frac{dn}{dT} \right) f_2 \cdot \Delta T$$

The formed image point is therefore moved on the side thereof opposite to the fθ lens 4.

The coefficient $\alpha'$ and the rate $dn/dT$ in the case of glass are approximately smaller by one figure than those of plastic so that the coefficient $\alpha'$ and the rate $dn/dT$ in the case of glass can be substantially neglected.

The above changes A and B in position of the formed image point are caused such that these changes are canceled with respect to each other. Accordingly, when a ratio of absolute values of these changes is set to a value close to 1, it is possible to almost completely cancel the change in position of the formed image point caused by the change in temperature.

The change in position of the formed image point caused by the change in temperature can be reduced by setting a ratio ($-A/B$) of the changes A and B to a value different from the value 1 as follows.

$$0.5 < -\frac{A}{B} = \frac{f_2}{f_1} \cdot \frac{\alpha}{\alpha' - \frac{1}{n-1} \cdot \frac{dn}{dT}} < 2$$

When the ratio ($-A/B$) is less than a lower limit value 0.5, it is insufficient to correct the change in temperature of the plastic material constituting the fθ lens 4. In contrast to this, when the ratio ($-A/B$) exceeds an upper limit value 2, the change in temperature of the plastic material is excessively corrected.

Concrete materials used for the holding member 6 and the fθ lens 4 will next be described.

Table 1 shows typical materials considered as the holding member 6 for connecting the light source 1 and the condenser lens 2 to each other and their coefficients $\alpha$ of linear expansion.

TABLE 1

| No. | material | $\alpha$ ($\times 10^{-5}/K$) |
|---|---|---|
| 1 | aluminum | 2.3 |
| 2 | brass | 1.8~2.3 |
| 3 | stainless steel | 1.64 |
| 4 | iron | 1.2 |
| 5 | PC (including glass fiber) | 3.0~5.5 |
| 6 | BMC (including glass fiber) | 2.0~5.0 |
| 7 | PPS (including glass fiber) | 2.0~4.5 |
| 8 | modified PPO (including glass fiber) | 3.0~5.5 |

The materials with respect to numbers 1 to 4 are composed of metals or alloys. The materials with respect to numbers 5 to 8 are composed of resins including glass fiber.

Table 2 shows typical plastic materials constituting the fθ lens 4, their coefficients $\alpha'$ of linear expansion, their refractive indexes n in the case of wavelength 780 nm, and their rates $dn/dT$ of change in refractive index with respect to temperature.

TABLE 2

| No. | material | $\alpha$ ($\times 10^{-5}/K$) | n | $(dn/dT)(\times 10^{-5}/K)$ |
|---|---|---|---|---|
| 1' | PC (polycarbonate) | 7.0 | 1.57 | $-9 \sim -14$ |
| 2' | PMMA (acrylic resin) | 6.3 | 1.49 | $-8.5 \sim -11$ |
| 3' | polystyrene | 8.0 | 1.58 | $-12 \sim -14$ |

Tables 3 and 4 show the values of the changes A and B with respect to the respective materials when $f_2 = 200$ (mm) and the variation width of temperature $\Delta T = 50$ [K]. Tables 3 and 4 also show values $A/\Delta t$ and $B/\Delta T$.

With respect to the materials of the holding member 6 in Table 3 and 4, $f_1 = 10$ (mm) is set in the case of numbers 1 to 4, and $f_1 = 20$ (mm) is set in the case of numbers 5 to 8.

TABLE 3

| No. | material | A/ΔT [mm/K] | A [mm] |
|---|---|---|---|
| 1 | aluminum | $-0.092$ | $-4.6$ |
| 2 | brass | $-0.072 \sim -0.092$ | $-3.6 \sim -4.6$ |
| 3 | stainless steel | $-0.0656$ | $-3.28$ |
| 4 | iron | $-0.048$ | $-2.4$ |
| 5 | PC (including glass fiber) | $-0.06 \sim -0.11$ | $-3.0 \sim -5.5$ |
| 6 | BMC (including glass fiber) | $-0.04 \sim -0.1$ | $-2.0 \sim -5.0$ |
| 7 | PPS (including glass fiber) | $-0.04 \sim -0.09$ | $-2.0 \sim -4.5$ |
| 8 | modified PPO (including glass fiber) | $-0.06 \sim -0.11$ | $-3.0 \sim -5.5$ |

TABLE 4

| No. | material | B/ΔT [mm/K] | B [mm] |
|---|---|---|---|
| 1' | PC (polycarbonate) | 0.046~0.063 | 2.3~3.15 |
| 2' | PMMAC (acrylic resin) | 0.047~0.057 | 2.35~2.85 |
| 3' | polystyrene | 0.057~0.064 | 2.85~3.2 |

Tables 5 to 7 show the total change A+B in position of the formed image point caused by the change in temperature with respect to a combination of the respective materials of the holding member 6 and the fθ lens 4 when the change in environmental temperature is caused. Tables 5 to 7 also show the ratio $-A/B$ of these changes A and B with respect to the combination of the respective materials.

TABLE 5

| material No. of holding member | material No. of fθ lens 4 1' | |
|---|---|---|
| | A + B | −A/B |
| 1 | −2.3 ~ −1.45 | 1.46 ~ 2.0 |
| 2 | −2.3 ~ −0.45 | 1.14 ~ 2.0 |
| 3 | −0.98 ~ −0.13 | 1.04 ~ 1.43 |
| 4 | −0.1 ~ 0.75 | 0.76 ~ 1.04 |
| 5 | −3.2 ~ 0.15 | 0.95 ~ 2.39 |
| 6 | −2.7 ~ 1.15 | 0.63 ~ 1.59 |
| 7 | −2.2 ~ 1.15 | 0.63 ~ 1.96 |
| 8 | −3.2 ~ 0.15 | 0.95 ~ 2.39 |

TABLE 6

| material No. of holding member | material No. of fθ lens 4 2' | |
|---|---|---|
| | A + B | −A/B |
| 1 | −2.25 ~ −1.75 | 1.61 ~ 1.96 |
| 2 | −2.25 ~ −0.75 | 1.26 ~ 1.96 |
| 3 | −0.93 ~ −0.43 | 1.15 ~ 1.4 |
| 4 | −0.05 ~ 0.45 | 0.84 ~ 1.02 |
| 5 | −3.15 ~ 0.15 | 1.05 ~ 2.34 |
| 6 | −2.65 ~ 1.85 | 0.7 ~ 2.13 |
| 7 | −2.15 ~ 0.85 | 0.7 ~ 1.91 |
| 8 | −3.15 ~ 0.15 | 1.05 ~ 2.34 |

TABLE 7

| material No. of holding member | material No. of fθ lens 4 3' | |
|---|---|---|
| | A + B | −A/B |
| 1 | −1.75 ~ −1.4 | 1.46 ~ 1.61 |
| 2 | −1.75 ~ −0.4 | 1.13 ~ 1.61 |
| 3 | −0.43 ~ −0.08 | 1.03 ~ 1.15 |
| 4 | 0.45 ~ 0.8 | 0.75 ~ 0.84 |
| 5 | −2.3 ~ 0.2 | 0.94 ~ 1.93 |
| 6 | −2.15 ~ 1.2 | 0.63 ~ 1.75 |
| 7 | −1.65 ~ 1.2 | 0.63 ~ 1.58 |
| 8 | −2.3 ~ 0.2 | 0.94 ~ 1.93 |

From the above tables, it should be understood that the absolute value $|A+B|$ can be set to be smaller than the absolute value $|B|$.

With respect to the materials of the holding member 6 in the case of numbers 5 to 8, the ratio $-A/B$ exceeds the upper limit value thereof in some cases for the following reasons.

With respect to the resins including glass fiber, their coefficients of linear expansion are different from each other in accordance with the longitudinal direction of the glass fiber. In Table 1, the variation width of the value $a$ is large since this value includes dispersion depending on the longitudinal direction of the glass fiber. When each of the resins is actually used, the longitudinal direction of the glass fiber providing a small coefficient of linear expansion is set to the direction of the optical axis of the condenser lens 2 so that the ratio $-A/B$ can be set to a value less than the upper limit value 2.

In the above-mentioned description, the chromatic aberration of the condenser lens 2 on the optical axis thereof is assumed to be completely corrected. However, the condenser lens can be suitably compensated with respect to temperature in consideration of the chromatic aberration of this lens on the optical axis thereof.

For example, as shown in Japanese Patent Application Laying Open (KOKAI) No. 63-7530 mentioned above, the chromatic aberration of the condenser lens 2 on the optical axis thereof may be provided to cancel the shift in wavelength of the light beam from the light source based on the change in temperature.

A scanning optical system in a second embodiment of the present invention will next be described.

In this scanning optical system, similar to the first embodiment, the change A in position of the formed image point in the vicinity of the scanned face is caused by the change in distance (length of the holding member 6) between the light source 1 and the condenser lens 2 caused by the change in temperature, and the change B in position of the formed image point is caused by the change in temperature of the fθ lens 4. Therefore, the explanation about these changes are omitted in the following description.

In the scanning optical system in the second embodiment, the change in position of the formed image point in the vicinity of the scanned face is also caused by the shift in emission wavelength of the light beam from the light source 1 caused by the change in temperature.

The chromatic aberration of the condenser lens 2 on the optical axis thereof is set to $df_1/d\lambda$. The shift in wavelength of the light beam emitted from the light source 1 with respect to the change in temperature is set to $d\lambda/dT$. In this case, the change $\Delta f_1$ in focal length $f_1$ of the condenser lens 2 can be represented as follows.

$$\Delta f_1 = (d\lambda/dT)\cdot(df_1/d\lambda)\cdot\Delta_T.$$

If $f_1$ is changed to $f_1+\Delta f_1$ and $\Delta f_2 << f_1$ is set, the distances $S_1'$, $S_2$ and $S_2'$ are changed as follows.

$$S_1' = \infty \rightarrow -f_1^2/\Delta f_1$$

$$S_2 = \infty \rightarrow (-f_1^2/\Delta f_1) - D \sim f_1^2/\Delta f_1$$

$$S_2' = f_2 \rightarrow f_2 + (f_2/f_1)^2\cdot\Delta f_1.$$

Accordingly, the change A' in position of the formed image point caused by the shift in wavelength caused by the chromatic aberration of the condenser lens 2 and the change in temperature is represented as follows.

$$A' = \left(\frac{f_2}{f_1}\right)^2 \cdot \frac{d\lambda}{dT} \cdot \frac{df_1}{d\lambda} \cdot \Delta T$$

At this time, the formed image point is moved on the side thereof opposite to the fθ lens 4 in accordance with the increase in temperature.

The change $(A+A')$ in position of the formed image point with respect to the light source 1 and the condenser lens 2 is generally caused such that this change $(A+A')$ is canceled by the change B in position of the formed image point with respect to the fθ lens 4 made of plastic for optics. Accordingly, when a ratio of absolute values of these changes is set to a value close to 1, the change in position of the formed image point caused by the change in temperature can be almost completely canceled.

When the above ratio is not set to 1 and the changes A, A' and B are set by the following inequality, the change $(A+A'+B)$ in position of the formed image point caused by the change in temperature can be reduced.

$$0.3 < -\frac{A+A'}{B} = \frac{f_2}{f_1} \cdot \frac{\alpha - \frac{1}{f_1} \cdot \frac{d\lambda}{dT} \cdot \frac{df_1}{d\lambda}}{\alpha' - \frac{1}{n-1} \cdot \frac{dn}{dT}} < 2$$

When the ratio $-(A+A')/B$ is less than the lower limit value 0.3, it is insufficient to correct the change in temperature of the plastic material constituting the $f\theta$ lens 4. In contrast to this, when this ratio exceeds the upper limit value 2, the change in temperature of the plastic material is excessively corrected.

Concrete materials used for the holding member 6 and the $f\theta$ lens 4 will next be described in the scanning optical system in the second embodiment of the present invention.

Typical materials usable for the holding member 6 and the coefficients $\alpha$ of linear expansion thereof are the same as those in the above Table 1. Typical materials of the $f\theta$ lens 4, their coefficients $\alpha'$ of linear expansion, their refractive indexes n in the case of wavelength 780 nm, and their changes dn/dT in refractive index with respect to the change in temperature are the same as those in the above Table 2.

Accordingly, when $f_2 = 200$ (mm) and the variation width of temperature $\Delta T = 50$ [K], the values of the changes A and B with respect to the respective materials are similar to those in the above Tables 3 and 4.

When the change in environmental temperature is caused, the value of the total change $A+B$ in position of the formed image point of the $f\theta$ lens 4 with respect to a combination of the respective materials of the holding member 6 and the $f\theta$ lens 4 is also similar to that shown in the above Tables 5 to 7.

It is next considered that the change A' in position of the formed image point caused by the chromatic aberration of the condenser lens 2 and the shift in wavelength caused by the change in temperature is included in the change $A+A'+B$ in position of the entire optical system to set this change $A+A'+B$ to a value smaller than the above-mentioned value $|A+B|$.

When it is assumed that a semiconductor laser is used as the light source 1, the shift in wavelength of the light beam from this light source with respect to the change in temperature is generally provided as follows.

$d\lambda/d_T \sim 0.25$ (nm/K).

Accordingly, when $f_2 = 200$ mm is set, the change A' is provided as follows.

$$A' = \left(\frac{f_2}{f_1}\right)^2 \cdot \frac{d\lambda}{dT} \cdot \frac{df_1}{d\lambda} \cdot \Delta T$$

$$= \begin{cases} 100 \cdot \frac{df_1}{d\lambda} \cdot \Delta T \text{ (when } f_1 = 10) \\ 25 \cdot \frac{df_1}{d\lambda} \cdot \Delta T \text{ (when } f_1 = 20) \end{cases}$$

When the variation width of temperature $\Delta T$ is assumed to be 50 [K], the change A' is provided as follows.

$$A' = \begin{cases} 5000 \cdot \frac{df_1}{d\lambda} \text{ (when } f_1 = 10) \\ 1250 \cdot \frac{df_1}{d\lambda} \text{ (when } f_1 = 20) \end{cases}$$

Therefore, it is possible to reduce the value of the above change $A+A'+B$ by setting the value $df_1/d\lambda$ to a suitable value so that the ratio $-(A+A')/B$ approaches "1".

Table 8 shows the suitable chromatic aberration $df_1/d\lambda$ and the change A' with respect to a combination of the respective materials. Table 9 shows the change $A+A'+B$ and the ratio $-(A+A')/B$ shown by parentheses in this combination.

TABLE 8

| material No. of holding member | material No. of f$\theta$ lens | | | | | |
|---|---|---|---|---|---|---|
| | 1' | | 2' | | 3' | |
| | df$_1$/d$\lambda$ [$\mu$m/nm] | A' | df$_1$/d$\lambda$ [$\mu$m/nm] | A' | df$_1$/d$\lambda$ [$\mu$m/nm] | A' |
| 1 | 0.375 | 1.88 | 0.4 | 2.0 | 0.315 | 1.58 |
| 2 | 0.275 | 1.38 | 0.3 | 1.5 | 0.215 | 1.08 |
| 3 | 0.111 | 0.56 | 0.136 | 0.68 | 0.051 | 0.26 |
| 4 | −0.065 | −0.33 | −0.04 | −0.2 | −0.125 | −0.63 |
| 5 | 1.22 | 1.53 | 1.32 | 1.65 | 0.84 | 1.05 |
| 6 | 0.62 | 0.78 | 0.72 | 0.9 | 0.38 | 0.48 |
| 7 | 0.42 | 0.53 | 0.52 | 0.65 | 0.18 | 0.23 |
| 8 | 1.22 | 1.53 | 1.32 | 1.65 | 0.84 | 1.05 |

TABLE 9

| material No. of holding member | material No. of f$\theta$ lens | | |
|---|---|---|---|
| | 1' | 2' | 3' |
| 1 | −0.42~0.43° | −0.25~0.25 | −0.17~0.18 |
| | (0.86~1.18) | (0.91~1.13) | (0.94~1.06) |
| 2 | −0.92~0.93 | −0.75~0.75 | −0.67~0.68 |
| | (0.7~1.4) | (0.74~1.32) | (0.79~1.24) |
| 3 | −0.42~0.43 | −0.25~0.25 | −0.17~0.18 |
| | (0.86~1.18) | (0.91~1.11) | (0.94~1.06) |
| 4 | −0.43~0.42 | −0.25~0.25 | −0.18~017 |
| | (0.87~1.19) | (0.91~1.11) | (0.95~1.06) |
| 5 | −1.67~1.68 | −1.5~1.5 | −1.25~1.25 |
| | (0.47~1.73) | (0.47~1.64) | (0.61~1.56) |
| 6 | −1.92~1.93 | −1.75~1.75 | −1.67~1.68 |
| | (0.39~1.83) | (0.39~1.74) | (0.48~1.59) |
| 7 | −1.67~1.68 | −1.5~1.5 | −1.42~1.43 |
| | (0.47~1.73) | (0.47~1.64) | (0.55~1.5) |
| 8 | −1.67~1.68 | −1.5~1.5 | −1.25~1.25 |
| | (0.47~1.73) | (0.47~1.64) | (0.61~1.56) |

As shown in Table 9, the total change $A+A'+B$ in position of the formed image point can be reduced by providing the above-mentioned suitable chromatic aberration for the condenser lens 2.

In this Table 9, each of the total change $A+A'+B$ and the ratio $-(A+A')/B$ has a certain width since each of the characteristic values $\alpha$ and dn/dT of the respective materials has a certain width provided by using a general numeric value.

Accordingly, when these characteristic values are definitely determined, it is possible to make an accurate design for temperature compensation.

For example, when the condenser lens 2 is constructed by one group of two lenses composed of negative and positive lenses arranged from the side of the light source 1, the focal length of the positive lens is set to $f_3$ and its Abbe number is set to $v_3$. Further, the focal length of the negative lens is set to $f_4$ and its Abbe number is set to $\nu_4$. In this case, to provide the suitable chromatic aberration for the condenser lens 2, the following value, $$\frac{1}{f_3 \cdot \nu_3} + \frac{1}{f_4 \cdot \nu_4}$$

is set to a value corresponding to this suitable chromatic aberration (see Japanese Patent Application Laying Open (KOKAI) No. 63-8625 mentioned above). The condenser lens can be constructed by e.g., two groups of four lenses when no condition for the predetermined chromatic aberration is obtained in the case of one group of two lenses.

As mentioned above, in the scanning optical system in the second embodiment of the present invention, the suitable chromatic aberration is provided for the condenser lens 2. Further, the material of the connection holding member 6 and the plastic material for optics of the $f\theta$ lens 4 are suitably provided in combination with the respective values $f_1$, $f_2$ and $df_1/d\lambda$ mentioned above. Otherwise, the material of the connection holding member 6 and the plastic material of the $f\theta$ lens 4 are suitably selected in accordance with the respective values $f_1$, $f_2$ and $df_1/d\lambda$. Concretely, these materials satisfy the above-mentioned conditions. Thus, the total change in position of the formed image point in the vicinity of the scanned face 5 is reduced so that the scanning optical system withstanding the change in environmental temperature is provided.

Further, in the second embodiment, the approximately parallel light beam from the condenser lens 2 is converged by the $f\theta$ lens 4 and the scanned face 5 is arranged in the vicinity of a convergent point of the light beam, thereby greatly improving field curvature on the scanned face 5.

The scanning optical system of the present invention is not limited to that in the second embodiment mentioned above, but can be changed in various kinds of modifications within the scope of the features of the invention.

For example, in the second embodiment, the laser beam is used as the light beam emitted from the light source, but another kind of light beam may be used. It is possible to use optical glass, a plastic material for optics, etc. as the material of the condenser lens.

The scanning optical system of the present invention can be also used as that in a reading device, a laser display, a laser measuring device, etc.

A scanning optical system in each of third and fourth embodiments of the present invention will next be described in detail.

Figure 3:
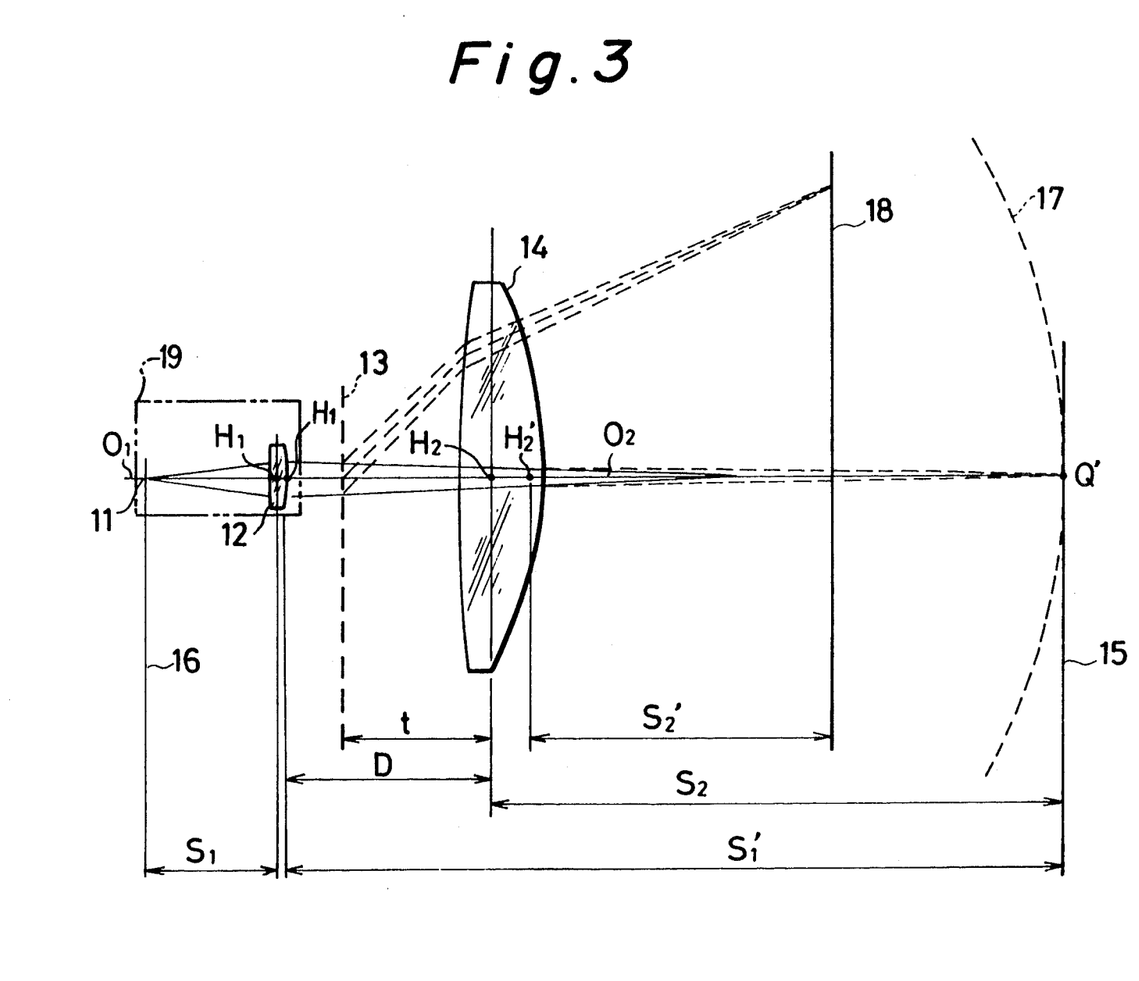
FIG. 3 is a view typically showing an optical path of a scanning optical system in each of third and fourth embodiments of the present invention.

FIG. 3 is a view typically showing an optical path of the scanning optical system in each of the third and fourth embodiments.

A light source 11 corresponds to the light source 51 shown in FIG. 1 and is composed of e.g., a laser diode for emitting a light beam for optical scanning. The light source 11 is arranged such that the divergent laser beam is incident to a condenser lens 12.

In this case, the condenser lens 12 is desirably constructed by a single lens or a plurality of lenses made of glass and preferably corrected with respect to the chromatic aberration. If not optical element is arranged on an image face side of the condenser lens 12, the laser beam incident to the condenser lens 12 is formed as an image at a virtual point Q' on a virtual face 15.

The light source 11 and the condenser lens 12 are fixedly supported by a connection holding member 19 constructed by a material described later. The light source 11 is located on an optical axis of an object face 16 perpendicular to a first optical axis $O_1$ of the scanning optical system. The condenser lens 12 is set to be located on the first optical axis $O_1$ and separated from this object face 16 by an axial distance (object distance) $S_1$.

In FIG. 3, reference numeral $S_1$ designates a distance from a main point $H_1$ of the condenser lens 12 on the front side thereof to the object face 16. Reference numeral $S_1'$ designates a virtual distance from a main point $H_1'$ of the condenser lens 12 on the rear side thereof to the virtual point Q'.

A deflector is composed of a polygon mirror, a pyramidal mirror, etc. and has a deflecting face 13 typically shown in FIG. 3. This deflecting face 13 corresponds to the reflecting face of the rotary polygon mirror 53a of the deflector 53 in FIG. 1.

Reference numeral 17 typically shows a moving local face of a formed image point of the convergent light beam when the convergent light beam from the condenser lens 12 is deflected on a second optical axis $O_2$ of the scanning optical system by rotating the deflecting face 13 of the deflector.

This moving local face 17 is shown as an arc face in FIG. 3. When the deflector is composed of a polygon mirror, the position of a deflecting start point is slightly changed on the second optical axis $O_2$ so that the moving local face 17 cannot be formed as a perfect arc face, but is approximately formed as the arc face.

An $f\theta$ lens 14 is composed of a single lens for optical scanning and having positive refracting power. The $f\theta$ lens 14 is made of plastic for optics described later and is arranged such that a main point $H_2$ of this lens on the front side thereof is separated from a main point $H_1'$ of the condenser lens 12 on the rear side thereof by the distance D.

The convergent laser beam reflected on the deflecting face 13 of the deflector is formed by the $f\theta$ lens 14 as an image in the shape of a spot on a scanning line of a scanned face 18 directly or through a suitable fixed reflecting mirror.

In other words, this $f\theta$ lens 14 is ideally constructed such that the moving locus of the light beam from the condenser lens 12 deflected by the deflector is set in an object position of a virtual light source and this object position and the scanned face 18 are arranged in a conjugate relation.

The focal length of the $f\theta$ lens 14 is set to $f_2$ and the axial distance from the main point $H_2$ of the $f\theta$ lens 14 on the front side thereof to the virtual point Q' is set to $S_2$. Further, the axial distance from the main point $H_2'$ of the $f\theta$ lens 14 on the rear side thereof to the scanned face 18 is set to $S_2'$. In this case, the following formula is formed.

$$(1/S_2) - (1/S_2') = -1/f_2.$$

In FIG. 3, reference numeral t designates an entrance pupil distance from the main point $H_2$ of the $f\theta$ lens 14 on the front side thereof to the deflecting face 13.

In the scanning optical system constructed above, the convergent laser beam is deflected on the deflecting face 13 of the deflector at an equal angular velocity and is formed by the $f\theta$ lens 14 as an image on the scanned face 18. The scanning operation with respect to this laser beam is performed on the scanning line of the scanned face 18 at an approximately equal speed.

As mentioned above, this approximately equal speed means a speed provided such that a shift in speed from the equal speed can be corrected by an electric signal processing.

In this scanning optical system, the change in position of the above virtual point Q' caused by the change in environmental temperature will next be considered.

As mentioned above, the change in position of the virtual point Q' caused by the change in temperature and the change in position of the image point formed by the fθ lens 14 are considered to be composed of the change in distance between the light source 11 and the condenser lens 12 caused by the change in temperature, and the changes in shape and optical characteristic of the fθ lens 14 caused by the change in temperature.

The focal length of the condenser lens 12 is set to $f_1$. The coefficient of linear expansion of the connection holding member for supporting the light source 11 and the condenser lens 12 is set to $\alpha$, and the change in temperature is set to $\Delta T$. Further, the length of the connection holding member is assumed to be equal to the focal length $f_1$ of the condenser lens 12. In this case, similar to the above-mentioned case, the change $\Delta$ in distance between the light source 11 and the condenser lens 12 caused by the change in temperature can be represented as follows.

$$\Delta = \alpha \times f_1 \times \Delta T.$$

When the object distance $S_1$ in FIG. 3 is assumed to be equal to an object distance $S_{10}$ at the designing time of the scanning optical system and the change $\Delta T$ in temperature is caused, the object distance $S_1$ is changed to $S_{10} - \Delta$.

In this case, the following formulas are generally formed.

$$1/S_1' = 1/S_1 + 1/f_1$$

$$1/S_2' = 1/S_2 + 1/f_2$$

$$S_2 = S_1' - D.$$

When $\Delta << f_1$ is assumed to be formed and the object distance $S_1$ is changed from $S_{10}$ to $S_{10} - \Delta$ by the change in temperature, the virtual distance $S_1'$ of the condenser lens 12 is changed as follows.

$$S_1' = S_{10}' \to S_1' = S_{10}' - \beta_1^2 \times \Delta.$$

The distance $S_2$ from the main point $H_2$ of the fθ lens 14 on the front side thereof to the virtual face 15 is changed as follows.

$$S_2 = S_{20} \to S_2 = S_{20} - \beta_1^2 \times \Delta$$

Further, the distance $S_2'$ from the main point $H_2'$ of the fθ lens 14 on the rear side thereof to the scanned face 18 is changed as follows.

$$S_2' = S_{20}' \to S_2' = S_{20}' - \beta_1^2 \times \beta_2^2 \times \Delta.$$

In this case, reference numerals $S_{10}'$, $S_{20}$, $S_{20}'$, $\beta_1$ and $\beta_2$ are defined as follows.

$S_{10}'$ designates a distance from the condenser lens 12 to an image formed by this lens at the designing time of the scanning optical system.

$S_{20}$ designates a distance from the main point $H_2$ of the fθ lens 14 on the front side thereof to the virtual point Q' formed by the condenser lens 12 at the designing time of the optical scanning system.

$S_{20}'$ designates a distance from the main point $H_2'$ of the fθ lens 14 on the rear side thereof to the image point formed by the fθ lens 14 on the scanned face 18 at the designing time of the scanning optical system.

$\beta_1$ designates a lateral magnification of the condenser lens 12 and is equal to $S_{10}'/S_{10}$.

$\beta_2$ designates a lateral magnification of the fθ lens 14 and is equal to $S_{20}'/S_{20}$.

Accordingly, the change A in position of the image point formed by the fθ lens 14 caused by the thermal expansion of the connection holding member caused by the change in temperature is represented as follows from the above formulas of the change $\Delta$ and the distance $S_2'$.

$$A = -\beta_1^2 \times \beta_2^2 \times \alpha \times f_1 \times \Delta T.$$

At this time, the formed image point is moved on the side of the fθ lens 14 (in the left-hand direction in FIG. 3) in accordance with the increase in temperature.

The changes in shape and optical characteristic of the fθ lens 14 caused by the change in temperature will next be described.

The coefficient of linear expansion of an optical material constituting the fθ lens 14 is set to $\alpha'$. The rate of change in refractive index of the fθ lens 14 with respect to the change in temperature is set to $dn/dT$. In this case, when this lens is deformed in a similar figure, the rate of change in focal length of a single lens with respect to temperature can be generally represented approximately by the following formula.

$$\frac{1}{f} \times \frac{df}{dT} = \alpha' - \frac{1}{n-1} \times \frac{dn}{dT}$$

The change $\Delta f_2$ in focal length of this lens is therefore represented as follows.

$$\Delta f_2 = \left( \alpha' - \frac{1}{n-1} \times \frac{dn}{dT} \right) \times f_2 \times \Delta T$$

Accordingly, the change B in position of the formed image point caused by the change in temperature of the fθ lens 14 is provided as follows.

$$B = (1 - \beta_2)^2 \times \left( \alpha' - \frac{1}{n-1} \times \frac{dn}{dT} \right) \times f_2 \times \Delta T$$

At this time, the formed image point is moved on the side thereof separated from the fθ 14 (in the right-hand direction in FIG. 3) in accordance with the increase in temperature.

Further, the change B in position of the formed image point caused by the change in temperature of the fθ lens 14, and the above change A in position of the image point formed by the condenser lens 12 caused by the thermal expansion of the connection holding member are caused to be canceled with respect to each other. Accordingly, when the optical scanning system is constructed such that a ratio of absolute values of these changes A and B is set to "1", it is possible to cancel the change in position of the image point formed by the fθ 14 caused by the change in environmental temperature.

The above change in position of the formed image point can be reduced by setting the ratio $-A/B$ of absolute values of the changes A and B as follows even when this ratio is not equal to "1".

$$0.5 < -\frac{A}{B} = \frac{\beta_1^2 \times \beta_2^2}{(1-\beta_2)^2} \times \frac{f_1}{f_2} \times \frac{a}{a' - \frac{1}{n-1} \times \frac{dn}{dT}} < 2.0$$

When the ratio $-A/B$ is less than a lower limit value thereof, it is insufficient to correct the change in temperature of the fθ lens 14 made of plastic. In contrast to this, when the ratio $-A/B$ exceeds an upper limit value thereof, the change in temperature of the fθ lens 14 is excessively corrected.

Concrete materials used for the connection holding member and the fθ lens 14, and concrete values of the changes $A+B$ and $-A/B$ in position of the formed image point with respect to a combination of the respective materials will next be described.

Typical materials usable for the connection holding member and the coefficients $a$ of linear expansion thereof are similar to those shown in Tables 1 and 2 in the first and second embodiments.

A typical plastic material for optics usable for the fθ lens 14 is also similar to that described in the first and second embodiments. Accordingly, the coefficient $a$ of linear expansion of this plastic material, the refractive index n thereof in the case of wavelength 780 nm, and the change dn/dT in refractive index of this plastic material with respect to the change in temperature are also similar to those shown in the Table 2.

Tables 10 and 11 respectively show the values of the changes A and B and the ratios A/ΔT and B/ΔT with respect to the respective materials when $f_2=200$ mm, $\beta_2=0.2$, and the variation width of the environmental temperature $\Delta T=50$ [K].

In this case, $f_1=8$ and $\beta_1=-80$ are set with respect to the materials of the connection holding member from number 1 to number 4. Further, $f_1=16$ and $\beta_1=-40$ are set with respect to the materials of the connection holding member from number 5 to number 8.

TABLE 10

| No. | material | A/ΔT [mm/K] | A [mm] |
|---|---|---|---|
| 1 | aluminum | −0.0471 | −2.36 |
| 2 | brass | −0.0369 ~ −0.0745 | −1.84 ~ −2.36 |
| 3 | stainless steel | −0.0336 | −1.68 |
| 4 | iron | −0.0246 | −1.23 |
| 5 | PC (including glass fiber) | −0.0307 ~ −0.0563 | −1.54 ~ −2.82 |
| 6 | BMC (including glass fiber) | −0.0205 ~ −0.0512 | −1.02 ~ −2.56 |
| 7 | PPS (including glass fiber) | −0.0205 ~ −0.0461 | −1.02 ~ −2.3 |
| 8 | modified PPO (including glass fiber) | −0.0307 ~ −0.0563 | −1.54 ~ −2.82 |

TABLE 11

| No. | material | B/ΔT [mm/K] | B [mm] |
|---|---|---|---|
| 1' | PC (polycarbonate) | 0.0292 ~ 0.0404 | 1.46 ~ 2.02 |
| 2' | PMMA (acrylic resin) | 0.0303 ~ 0.0368 | 1.51 ~ 1.84 |
| 3' | polystyrene | 0.0367 ~ 0.0411 | 1.84 ~ 2.06 |

Table 12 shows the values of the changes $A+B$ and $-A/B$ in position of the formed image point in the combination of the respective materials when the environmental temperature is changed. The values of the change $-A/B$ are shown by parentheses in this Table 12.

TABLE 12

| material No. of holding member | material No. of fθ lens | | |
|---|---|---|---|
| | 1' | 2' | 3' |
| 1 | −0.9 ~ −0.34 | −0.85 ~ −0.52 | −0.52 ~ −0.3 |
| | (1.17 ~ 1.62) | (1.28 ~ 1.56) | (1.15 ~ 1.28) |
| 2 | −0.9 ~ 0.18 | −0.85 ~ 0.0 | −0.52 ~ 0.22 |
| | (0.91 ~ 1.62) | (1.0 ~ 1.56) | (0.89 ~ 1.28) |
| 3 | −0.22 ~ 0.34 | −0.17 ~ 0.16 | 0.16 ~ 0.38 |
| | (0.83 ~ 1.15) | (0.91 ~ 1.13) | (0.82 ~ 0.91) |
| 4 | 0.23 ~ 0.79 | 0.28 ~ 0.61 | 0.62 ~ 0.83 |
| | (0.61 ~ 0.84) | (0.67 ~ 0.81) | (0.6 ~ 0.67) |
| 5 | −1.36 ~ 0.48 | −1.31 ~ 0.3 | −0.98 ~ 0.52 |
| | (0.76 ~ 1.93) | (0.84 ~ 1.87) | (0.75 ~ 1.53) |
| 6 | −1.1 ~ 1.0 | −1.05 ~ 0.82 | −0.72 ~ 1.04 |
| | (0.50 ~ 1.75) | (0.55 ~ 1.7) | (0.5 ~ 1.39) |
| 7 | −0.84 ~ 1.0 | −0.79 ~ 0.82 | −0.46 ~ 1.04 |
| | (0.50 ~ 1.58) | (0.55 ~ 1.52) | (0.5 ~ 1.25) |
| 8 | −1.36 ~ 0.48 | −1.31 ~ 0.3 | −0.98 ~ 0.52 |
| | (0.76 ~ 1.93) | (0.84 ~ 1.87) | (0.75 ~ 1.53) |

From the above Table 12, it should be understood that the absolute value $|A+B|$ can be set to be smaller than the absolute value $|B|$.

As mentioned above, in the scanning optical system in the third embodiment of the present invention, the material of the connection holding member and the plastic material for optics of the fθ lens 14 are provided in combination with the values of the focal length $f_1$ of the condenser lens 12 and the focal length $f_2$ of the fθ lens 14 so as to satisfy the above-mentioned formulas. Otherwise, the material of the connection holding member and the plastic material for optics of the fθ lens 14 are selected in accordance with the values of the focal length $f_1$ of the condenser lens 12 and the focal length $f_2$ of the fθ lens 14 so as to satisfy the above-mentioned formulas. Thus, it is possible to provide a scanning optical system in which the changes in position of the image points formed by both lenses 12 and 14 are small with respect to the change in environmental temperature.

In the third embodiment shown in FIG. 3, it is assumed that the chromatic correction of the condenser lens 12 is completely corrected. However, it is possible to further effectively compensate the condenser lens with respect to temperature by suitably setting the chromatic aberration in consideration of the shift in wavelength of the light beam from the light source 11 caused by the change in temperature.

The scanning optical system of the present invention is not limited to that in the third embodiment mentioned above, but can be changed in various kinds of modifications within the scope of the features of the invention.

For example, in the third embodiment shown in FIG. 3, the laser beam is used as the light beam emitted from the light source 11, but another kind of light beam may be used.

The optical glass is used as the material of the condenser lens 12, but a plastic material for optics can be used.

A scanning optical system in a fourth embodiment of the present invention will next be described.

The construction of the scanning optical system in the fourth embodiment of the present invention is approximately similar to that in the third embodiment of the present invention. Therefore, the description about the common construction of the scanning optical system is omitted and the construction of the scanning optical system different from that in the third embodiment will be mainly described.

For example, the construction of the scanning optical system in the fourth embodiment is similar to that shown in FIG. 3. Therefore, the description about this construction will be omitted.

The change A in position of an image point formed by the fθ lens 14 caused by thermal expansion or contraction of the connection holding member caused by the change in environmental temperature is represented as follows.

$$A = -\beta_1^2 \cdot \beta_2^2 \cdot a \cdot f_1 \cdot \Delta T.$$

This change A is similar to the change A described in the above-mentioned third embodiment of the present invention. At this time, the above formed image point is moved on the side of the fθ lens 14 in accordance with the increase in temperature.

The next description relates to the change in position of the formed image point in the vicinity of the scanned face 18 which is caused by the changes in shape and optical characteristic of the fθ lens 14 caused by the change in temperature.

The coefficient of linear expansion of an optical material of the fθ lens 14 is set to $\alpha'$. The rate of change in refractive index of the fθ lens 14 with respect to temperature is set to $dn/dT$. In this case, when this lens is deformed in a similar figure, the rate of change in focal length of a single lens with respect to temperature can be generally represented approximately by the following formula.

$$\frac{1}{f} \cdot \frac{df}{dT} = \alpha' - \frac{1}{n-1} \cdot \frac{dn}{dT}$$

The change $\Delta f_2$ in focal length of this lens can be therefore represented as follows.

$$\Delta f_2 = \left( \alpha' - \frac{1}{n-1} \cdot \frac{dn}{dT} \right) \cdot f_2 \cdot \Delta T$$

Accordingly, similar to the above-mentioned third embodiment, the change B in position of the formed image point caused by the change in temperature of the fθ lens 14 is provided as follows.

$$B = (1 - \beta_2)^2 \cdot \left( \alpha' - \frac{1}{n-1} \cdot \frac{dn}{dT} \right) \cdot f_2 \cdot \Delta T$$

At this time, the formed image point is moved on the side thereof opposite to the fθ 14 in accordance with the increase in temperature.

Concrete materials used as the connection holding member and the fθ lens 14 in the fourth embodiment are similar to those shown in Tables 1 and 2 in the first embodiment.

Tables 13 and 14 respectively show the values of the changes A and B and the ratios $A/\Delta T$ and $B/\Delta T$ with respect to the respective materials when $f_2 = 200$ mm, $\beta_2 = 0.2$, and the variation width of the environmental temperature $\Delta T = 50$ [K].

In this case, $f_1 = 6$ and $\beta_1 = -100$ are set with respect to the materials of the connection holding member from number 1 to number 4. Further, $f_1 = 12$ and $\beta_1 = -50$ are set with respect to the materials of the connection holding member from number 5 to number 8.

TABLE 13

| No. | material | A/ΔT [mm/K] | A [mm] |
|---|---|---|---|
| 1 | aluminum | −0.0552 | −2.76 |
| 2 | brass | −0.0432 ~ −0.0552 | −2.16 ~ −2.76 |
| 3 | stainless steel | −0.0394 | −1.97 |
| 4 | iron | −0.0288 | −1.44 |
| 5 | PC (including glass fiber) | −0.036 ~ −0.066 | −1.8 ~ −3.3 |
| 6 | BMC (including glass fiber) | −0.024 ~ −0.06 | −1.2 ~ −3.0 |
| 7 | PPS (including glass fiber) | −0.024 ~ −0.054 | −1.2 ~ −2.7 |
| 8 | modified PPO (including glass fiber) | −0.036 ~ −0.066 | −1.8 ~ −3.3 |

TABLE 14

| No. | material | B/ΔT [mm/K] | B [mm] |
|---|---|---|---|
| 1' | PC (polycarbonate) | 0.0292 ~ 0.0404 | 1.46 ~ 2.02 |
| 2' | PMMA (acrylic resin) | 0.0367 ~ 0.0368 | 1.51 ~ 1.84 |
| 3' | PS (polystyrene) | 0.0367 ~ 0.0411 | 1.84 ~ 2.06 |

Table 15 shows the values of the change $A+B$ in position of the image point formed by the fθ lens 14 in a combination of the respective materials of the connection holding material and the fθ lens 14 when the environmental temperature is changed.

TABLE 15

| material No. of holding member | material No. of fθ lens | | |
|---|---|---|---|
| | 1' | 2' | 3' |
| 1 | −1.3 ~ −0.74 | −1.25 ~ −0.92 | −0.92 ~ −0.7 |
| 2 | −1.3 ~ −0.14 | −1.25 ~ −0.32 | −0.92 ~ −0.1 |
| 3 | −0.51 ~ 0.05 | −0.46 ~ −0.13 | −0.13 ~ 0.09 |
| 4 | 0.02 ~ 0.58 | 0.07 ~ 0.4 | 0.4 ~ 0.62 |
| 5 | −1.84 ~ 0.22 | −1.79 ~ −0.04 | −1.46 ~ 0.26 |
| 6 | −1.54 ~ 0.82 | −1.49 ~ 0.64 | −1.16 ~ 0.86 |
| 7 | −1.24 ~ 0.82 | −1.19 ~ 0.64 | −0.86 ~ 0.86 |
| 8 | −1.84 ~ 0.22 | −1.79 ~ −0.04 | −1.46 ~ 0.26 |

From the above Table 15, it should be understood that the absolute value $|A+B|$ can be set to be smaller than the absolute value $|A|$ or $|B|$.

The next description relates to the change in position of the formed image point in the vicinity of the scanned face 18 caused by the shift in emission wavelength of the light source 11 caused by the change in temperature.

The shift in wavelength of the light beam emitted from the light source 11 with respect to the change in temperature is set to $d\lambda/dT$. The chromatic aberration of the condenser lens 12 on the optical axis thereof is set to $df_1/d\lambda$. In this case, the change $\Delta f_1$ in focal length $f_1$ of the condenser lens 12 can be represented as follows.

$$\Delta f_1 = \frac{d\lambda}{dT} \cdot \frac{df_1}{d\lambda} \cdot \Delta T$$

On the other hand, if $f_1$ is changed to $f_1 + \Delta f_1$ and $\Delta f_1 < < f_1$ is set, $f_1$ is changed to $f_1'$ as follows.

$$f_1 \rightarrow f_1' = f_1 \cdot \Delta f_1$$

Therefore, the distances $S_1'$, $S_2$ and $S_2'$ are changed as follows.

$$S_1' = S_{10}' \rightarrow S_{10}' + \beta_1^2 \cdot \Delta f_1$$

$$S_2 = S_{20} \rightarrow S_{20} + \beta_1^2 \cdot \Delta f_1$$

$$S_2' = S_{20}' \rightarrow S_{20}' + \beta_1^2 \cdot \beta_2^2 \cdot \Delta f_1.$$

Accordingly, the change A' in position of the formed image point caused by the shift $d\lambda/dT$ in wavelength of the light beam from the light source 11 with respect to the change in temperature is represented as follows from the above formulas.

$$A' = \beta_1^2 \cdot \beta_2^2 \cdot \frac{d\lambda}{dT} \cdot \frac{df_1}{d\lambda} \cdot \Delta T$$

At this time, the formed image point is moved on the side thereof opposite to the fθ lens 14 in accordance with the increase in temperature.

As mentioned above, the change A in position of the formed image point is caused by the thermal expansion of the connection holding member. The change A' in position of the formed image point is caused by the shift in wavelength of the light beam from the light source 11 and the chromatic aberration of the condenser lens 12 on the optical axis thereof. The change B in position of the formed image point is caused by the changes in shape and optical characteristic of the fθ lens 14. The total change (A + A') of the changes A and A' and the change B are generally caused such that the total change (A + A') is canceled by the change B.

Therefore, when a ratio of absolute values of the changes (A + A') and B is set to a value close to "1", it is possible to almost completely cancel the change in position of the formed image point in the vicinity of the scanned face caused by the change in environmental temperature.

The change in position of the formed image point caused by the change in environmental temperature can be reduced by setting the values of the respective changes (A + A') and B as shown in the following inequality even when the ratio of absolute values of the changes (A + A') and B is not equal to "1".

$$0.4 < -\frac{A + A'}{B} =$$

$$\frac{\beta_1^2 \cdot \beta_2^2}{(1 - \beta_2)^2} \cdot \frac{f_1}{f_2} \cdot \frac{\alpha - \frac{1}{f_1} \cdot \frac{d\lambda}{dT} \cdot \frac{df_1}{d\lambda}}{\alpha' - \frac{1}{n-1} \cdot d \cdot \frac{n}{dT}} < 2$$

In this case, when the ratio $-(A+A')/B$ in the above inequality is less than a lower limit value thereof, it is insufficient to correct the change in temperature of the fθ lens 14. In contrast to this, when this ratio in the inequality exceeds an upper limit value thereof, the change in temperature of the fθ 14 is excessively corrected.

It is next considered that the change A' in position of the formed image point caused by the chromatic aberration of the condenser lens 12 and the shift in wavelength of the light beam from the light source 11 caused by the change in temperature is included in the change A + A' + B in position of the entire optical system to set this change A + A' + B to be smaller than the above-mentioned change A + B.

When it is assumed that a semiconductor laser is used as the light source 11, the shift in wavelength of the light beam from this light source with respect to the change in temperature is generally provided as follows.

$$d\lambda/dT = 0.25 \text{ (nm/K)}.$$

Accordingly, when $f_2 = 200$ nm and $\beta_2 = 0.2$, the change A' is provided as follows.

$$A' = \beta_1^2 \cdot \beta_2^2 \cdot \frac{d\lambda}{dT} \cdot \frac{df_1}{d\lambda} \cdot \Delta T$$

$$= \begin{cases} 36 \cdot \frac{df_1}{d\lambda} \cdot \Delta T & (\beta_1 = -60) \\ 9 \cdot \frac{df_1}{d\lambda} \cdot \Delta T & (\beta_1 = -30) \end{cases}$$

When the variation width of temperature $\Delta T$ is assumed to be 50 [K], the change A' is provided as follows.

$$A' = \begin{cases} 1800 \cdot \frac{df_1}{d\lambda} & (\beta_1 = -60) \\ 450 \cdot \frac{df_1}{d\lambda} & (\beta_1 = -30) \end{cases}$$

Therefore, it is possible to reduce the value of the above change A + A' + B by setting the value of $df_1/d\lambda$ to a suitable value so that the ratio $-(A+A')/B$ approaches "1".

Table 16 shows the suitable chromatic aberration $df_1/d\lambda$ and the change A' with respect to a combination of the respective materials. Table 17 shows the change A + A' + B and the ratio $-(A+A')/B$ shown by parentheses in this combination.

TABLE 16

| material No. of holding member | material No. of fθ lens | | | | | |
|---|---|---|---|---|---|---|
| | 1' | | 2' | | 3' | |
| | item | | | | | |
| | $df_1/d\lambda$ [μm/nm] | A' | $df_1/d\lambda$ [μm/nm] | A' | $df_1/d\lambda$ [μm/nm] | A' |
| 1 | 0.57 | 1.02 | 0.61 | 1.09 | 0.45 | 0.81 |
| 2 | 0.4 | 0.72 | 0.44 | 0.79 | 0.28 | 0.51 |
| 3 | 0.13 | 0.23 | 0.17 | 0.3 | 0.01 | 0.02 |
| 4 | −0.17 | −0.3 | −0.13 | −0.23 | −0.28 | −0.51 |
| 5 | 1.8 | 0.81 | 1.96 | 0.88 | 1.33 | 0.6 |
| 6 | 0.8 | 0.36 | 0.96 | 0.43 | 0.33 | 0.15 |
| 7 | 0.47 | 0.21 | 0.62 | 0.28 | 0.0 | 0.0 |
| 8 | 1.8 | 0.81 | 1.96 | 0.88 | 1.33 | 0.6 |

TABLE 17

| material No. of holding member | material No. of fθ lens | | |
|---|---|---|---|
| | 1' | 2' | 3' |
| 1 | −0.28~0.28 | −0.16~0.17 | −0.11~0.11 |
| | (0.86~1.19) | (0.91~1.11) | (0.95~1.06) |
| 2 | −0.58~0.58 | −0.46~0.47 | −0.41~0.41 |
| | (0.74~1.4) | (0.74~1.3) | (0.8~1.22) |
| 3 | −0.28~0.28 | −0.16~0.17 | −0.11~0.11 |
| | (0.86~1.19) | (0.91~1.11) | (0.95~1.06) |
| 4 | −0.28~0.28 | −0.16~0.17 | −0.11~0.11 |
| | (0.86~1.19) | (0.91~1.11) | (0.95~1.06) |
| 5 | −1.03~1.03 | −0.91~0.92 | −0.86~0.86 |
| | (0.49~1.71) | (0.5~1.6) | (0.58~1.47) |
| 6 | −1.18~1.18 | −1.06~1.07 | −1.01~1.01 |
| | (0.42~1.81) | (0.42~1.7) | (0.51~1.55) |
| 7 | −1.03~1.03 | −0.91~0.92 | −0.86~0.86 |
| | (0.49~1.71) | (0.5~1.6) | (0.58~1.47) |
| 8 | −1.03~1.03 | 0.91~0.92 | −0.86~0.86 |
| | (0.49~1.71) | (0.5~1.6) | (0.58~1.47) |

As shown in Table 17, the total change $A+A'+B$ in position of the formed image point can be extremely reduced by providing the above-mentioned suitable chromatic aberration for the condenser lens 12.

In the Table 17, each of the total change $A+A'+B$ and the ratio $-(A+A')/B$ has a certain width since each of the characteristic values $\alpha$ and $dn/dT$ of the respective materials has a certain width provided by using a general numeric value.

Accordingly, when these characteristic values are definitely determined, it is possible to make a more accurate design for temperature compensation.

For example, when the condenser lens 12 is constructed by one group of two lenses composed of negative and positive lenses arranged from the side of the light source 11, the focal length of the positive lens is set to $f_3$ and its Abbe number is set to $\nu_3$. Further, the focal length of the negative lens is set to $f_4$ and its Abbe number is set to $\nu_4$. In this case, to provide the suitable chromatic aberration for the condenser lens 12, the following value, $$\frac{1}{f_3 \cdot \nu_3} + \frac{1}{f_4 \cdot \nu_4}$$

is set to a value corresponding to this suitable chromatic aberration. The condenser lens can be constructed by e.g., two groups of four lenses when no condition for the predetermined chromatic aberration is obtained in the case of one group of two lenses.

As mentioned above, in the scanning optical system in the fourth embodiment of the present invention, the suitable chromatic aberration is provided for the condenser lens 12. Further, the material of the connection holding member and the plastic material for optics of the fθ lens 14 are suitably provided in combination with the respective values $f_1$, $f_2$, $df_1/d\lambda$, $\beta_1$ and $\beta_2$ mentioned above. Otherwise, the material of the connection holding member and the plastic material of the fθ lens 14 are suitably selected in accordance with the respective values $f_1$, $f_2$, $df_1/d\lambda$, $\beta_1$ and $\beta_2$. Thus, the total change in position of the formed image point in the vicinity of the scanned face 18 is reduced so that the scanning optical system withstanding the change in environmental temperature can be provided.

Further, in the fourth embodiment shown in FIG. 3, the light beam converged by the condenser lens 12 is further converged by the fθ lens 14 and the scanned face 18 is arranged in the vicinity of a convergent point of the light beam, thereby greatly improving field curvature on the scanned face 18.

The scanning optical system of the present invention is not limited to that in the fourth embodiment mentioned above, but can be changed in various kinds of modifications within the scope of the features of the invention.

As mentioned above, when the material of the lens for optical scanning in the scanning optical system is made of plastic, the curvature of a face of this lens and the thickness thereof are greatly changed by the change in environment, especially, the change in temperature. Therefore, the focal length of the lengs for optical scanning is changed and the convergent point of the light beam transmitted from this lens is not formed on the scanned face. Accordingly, the diameter of the beam spot on the scanned face is not set to a suitable value so that the quality of the image is greatly reduced.

Such problems can be solved as follows in accordance with the first embodiment of the present invention. Namely, in the first embodiment, the coefficient $\alpha$ of linear expansion of the connection holding member, the focal length $f_1$ of the condenser lens, the coefficient $\alpha'$ of linear expansion of the fθ lens, the focal length $f_2$ of the fθ lens. The refractive index n thereof, and the change $dn/dT$ in refractive index with respect to the change in temperature are set to satisfy a specified correlation, i.e., the following conditional inequality.

$$0.5 < \frac{f_2}{f_1} \cdot \frac{\alpha}{\alpha' - \frac{1}{n-1} \cdot \frac{dn}{dT}} < 2$$

Thus, it is possible to suitably reduce the various kinds of changes caused by the change in temperature. Therefore, the diameter of the beam spot on the scanned face can be set to be constant so that it is possible to greatly improve the quality of an image finally obtained.

Further, when the scanning optical system in this first embodiment is applied to a reading device, a stable reading operation can be performed. When the scanning optical system in the first embodiment is applied to a laser measuring device, it is possible to perform a measuring operation with less error. The above advantages can be also obtained when the scanning optical system in the first embodiment is applied to all various kinds of equipments using the lens for optical scanning.

In the second embodiment of the present invention, it is generally possible to extremely reduce the change in focal length of the lens for optical scanning and the change in distance between the light source and the condenser lens caused by the change in environmental temperature, and reduce the above change in position of the formed image point caused by the shift in emission wavelength of the laser diode. Thus, the lens for optical scanning made of plastic can be practically used and it is possible to provide a scanning optical system cheaply manufactured and withstanding the change in environmental temperature and having a high performance.

In the third embodiment of the present invention, the change in focal length of the lens for optical scanning caused by the change in environmental temperature can be suitably canceled by the change in distance between the light source and the condenser lens. Thus, the change in position of the formed image point can be extremely reduced so that it is possible to practically use the lens for optical scanning made of plastic. Further, it is possible to provide a scanning optical system cheaply manufactured and withstanding the change in environmental temperature and having a high performance.

In the fourth embodiment of the present invention, it is generally possible to extremely reduce the change in focal length of the lens for optical scanning and the change in distance between the light source and the condenser lens caused by the change in environmental temperature, and reduce the above change in position of the formed image point caused by the shift in emission wavelength of the light source. Thus, it is possible to practically use the lens for optical scanning made of plastic. Further, it is possible to provide a scanning optical system cheaply manufactured and withstanding the change in environmental temperature and having a high performance.

Many widely different embodiments of the present invention may be constructed without departing from the spirit and scope of the present invention. It should be understood that the present invention is not limited to the specific embodiments described in the specification, except as defined in the appended claims.

What is claimed is:

1. A scanning optical system comprising:
   a light source for emitting a light beam;
   a condenser lens for changing the light beam from the light source to a convergent light beam;
   a connection holding member for supporting the light source and the condenser lens;
   a deflector for deflecting the convergent light beam transmitted from said condenser lens at an equiangular velocity; and
   a single lens for optical scanning for scanning a scanned face at an approximately equal speed while further converging the convergent light beam deflected by the deflector and forming an image in the shape of a spot on the scanned face, said lens for optical scanning being formed by a plastic material for optics;
   said scanning optical system being constructed such that a shift $d\lambda/dT$ in wavelength of the light beam emitted from said light source with respect to a change in environmental temperature, a coefficient $\alpha$ of linear expansion of said connection holding member, a focal length $f_1$ and a lateral magnification $\beta_1$ of said condenser lens, chromatic aberration $df_1/d\lambda$ of the condenser lens on an optical axis thereof, a focal length $f_2$, a refractive index n and a coefficient $\alpha'$ of linear expansion of said lens for optical scanning, a change $dn/dT$ in refractive index of said lens for optical scanning with respect to the change in environmental temperature, and a lateral magnification $\beta_2$ of the lens for optical scanning satisfy the following condition, $$0.4 < \frac{\beta_1^2 \cdot \beta_2^2}{(1-\beta_2)^2} \cdot \frac{f_1}{f_2} \cdot \frac{\alpha - \frac{1}{f_1} \cdot \frac{d\lambda}{dT} \cdot \frac{df_1}{d\lambda}}{\alpha' - \frac{1}{n-1} \cdot \frac{dn}{dT}} < 2.0.$$

2. A scanning optical system as claimed in claim 1, wherein a material of the connection holding member and the plastic material for optics constituting the lens for optical scanning are suitably selected in accordance with respective values of the focal length $f_1$ of the condenser lens, the lateral magnification $\beta_1$ of the condenser lens, the focal length $f_2$ of the lens for optical scanning, the lateral magnification $\beta_2$ of the lens for optical scanning, and the chromatic aberration $df_1/d\lambda$ of the condenser lens on the optical axis thereof.

3. A scanning optical system as claimed in claim 1, wherein in a case where the value of said chromatic aberration $df_1/d\lambda$ is nearly equal to zero, a focal length of said condenser lens is maintained at a substantially constant value even when the change in said wavelength of said light is caused by the change in environmental temperature.

* * * * *